A. L. PUTNAM.
VEHICLE WHEEL.
APPLICATION FILED MAR. 24, 1919.
1,438,400.
Patented Dec. 12, 1922.
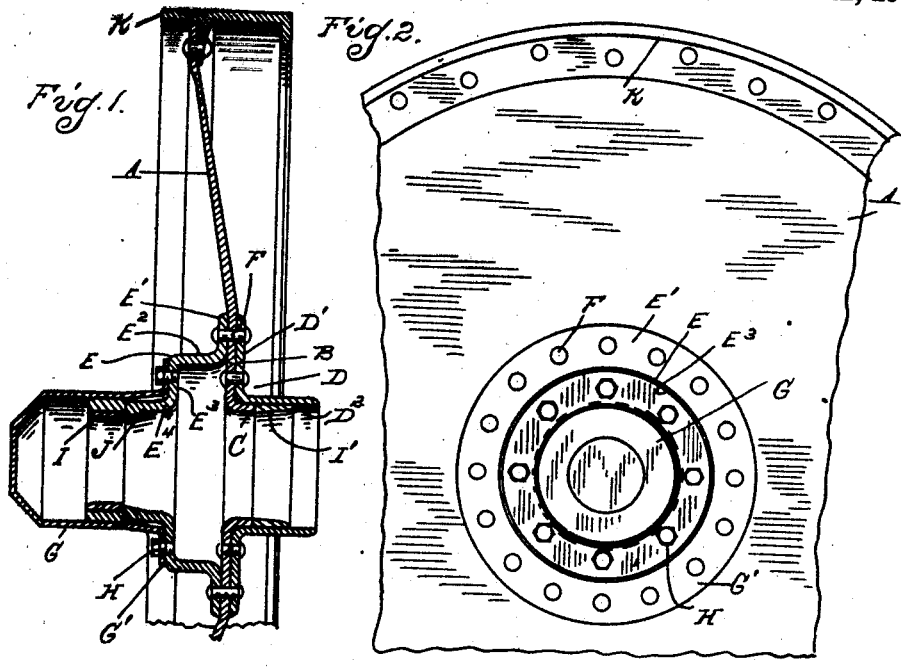
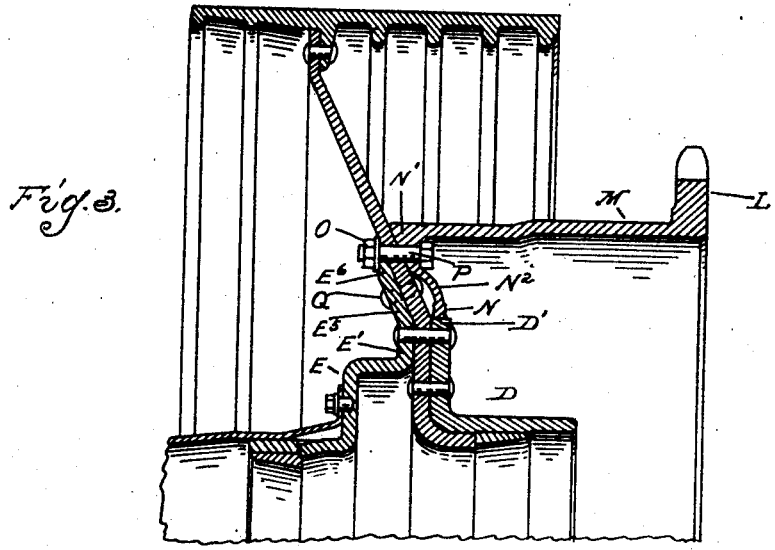
Inventor
Alden L. Putnam
By Whittemore Hulbert & Whittemore
Attorneys Patented Dec. 12, 1922.                                          1,438,400

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

VEHICLE WHEEL.

Application filed March 24, 1919. Serial No. 284,716.

*To all whom it may concern:*

Be it known that I, ALDEN L. PUTNAM, a citizen of the United States of America, residing at Detroit, in the county of Wayne and State of Michigan, have invented certain new and useful Improvements in Vehicle Wheels, of which the following is a specification, reference being had therein to the accompanying drawings.

The invention relates to vehicle wheels of the disk type and consists in the construction as hereinafter set forth.

In the drawings:

Figure 1 is a central longitudinal section through the wheel;

Figure 2 is a side elevation;

Figure 3 is a view similar to Figure 1 showing a modified construction.

In the present state of the art various constructions of disk wheels have been devised in which the disk is secured to a flange on the hub and extends outward therefrom to the rim to which it is also attached. With the present construction, in place of mounting the disk outside of the barrel of the hub and securing the same to a flange thereon, I have formed the hub of complementary sections secured upon opposite sides of the disk. Further, relieved the rivets or other connections between these sections from shearing stresses by forming a turned flange or shoulder on the disk engaging a complementary flange or shoulder on one of the hub sections.

In detail, A is the disk which is of a dished form and preferably of a cross-section tapering from the central portion towards the periphery. The central portion B of this disk is preferably in the plane of the wheel and at its inner edge is provided with a turned flange C. D is a hub section having a flange D' which lies adjacent to the portion B of the disk and a cylindrical portion $D^2$ which surrounds the turned flange C. E is a complementary hub section having a flanged portion E' parallel to the portions B and D' and secured thereto by rivets F or other suitable means. Extending outward from this flanged portion E' is a cylindrical portion $E^2$, an inwardly extending portion $E^3$ and an outwardly extending portion $E^4$. The latter forms a bearing for the cylindrical cap G, while the portion $E^3$ constitutes a bearing for the flange G' of said cap which is secured by bolts H or other suitable fastening devices. I and I' are the race members for a roller or other anti-friction bearings for the wheel; these being seated respectively in the portions $E^4$ and $D^2$ of the hub members E and D. The turned flange C of the disk forms an end thrust bearing for the race member I', while the race member I may be provided with an abutment by the inwardly extending lugs J or other suitable means. The outer edge of the disk is secured to a rim K in any suitable manner.

The construction as described forms a light, strong and inexpensive wheel and both the disk and hub sections are formed from pressed sheet metal, which, being die-fashioned, will be accurate in size and will require little machining.

In Figure 3 is shown a modified construction designed for use as a driven wheel and particularly where the wheel is driven by a sprocket. As shown, L is the sprocket member which is preferably integral with a drum M for the brake which surrounds the hub section D. At the forward end of the drum M is an inwardly extending flange N which is adapted to fit over the periphery of the flange D' and to be centered thereby. The flange N lies adjacent to the dished or obliquely extending portion of the disk and has a bearing N' to fit thereagainst. The outer hub E has an extension $E^5$ of the flange E' fitting against the dished or oblique portion of the disk and having its outer edge portion $E^6$ chamfered to lie parallel to the plane of the wheel. This forms a bearing for the clamping nuts O on securing bolts P which pass through the member N, the disk and the flange $E^5$ and serve to secure the drum and sprocket to the wheel. The flange $E^5$ may be secured to the disk by the additional rivets Q and the flange N is curved inwardly at $N^2$ to provide clearance for the heads of these rivets.

What I claim as my invention is:

1. A vehicle wheel, comprising a rim, a disk secured to and extending inward from said rim, being centrally apertured and provided with a turned flange surrounding said aperture, a hub section having a cylindrical portion engaging said turned flange and a flanged portion lying adjacent to said disk, a complementary hub section upon the opposite side of said disk, securing means between said sections and disk relieved from shearing stress by said turned flange, and a bearing within the cylindrical portion of said hub section abutting against said turned flange.

2. In a vehicle wheel, the combination with a rim, of a disk secured to and extending inward from said rim, being centrally apertured and provided with a turned flange adjacent to said aperture, a hub section having a cylindrical portion engaging said turned flange and a flanged portion lying adjacent to said disk, a complementary hub section on the opposite side of said disk having a flange lying adjacent thereto, an axial outwardly extending portion, a radial inwardly extending portion and an axial outwardly extending portion of smaller diameter, securing means between said hub sections and disk.

3. In a vehicle wheel, the combination with a hub and a dished disk secured thereto, of a drum surrounding said hub having an inwardly extending flange bearing thereagainst, said flange lying adjacent to the dished portion of the disk and having an oblique bearing for fitting thereagainst, securing bolts passing through said flange and disk, and a projection from the hub on the opposite side of the disk lying adjacent to the dished portion thereof having a chamfered edge portion forming a bearing for the securing bolts perpendicular to the axes thereof.

4. In a vehicle wheel, the combination with a dished disk, of complementary hub sections secured upon opposite sides of said disk and having outwardly extending flanges parallel to the disk, a brake drum surrounding one of said hub sections having an inwardly extending flange fitting and centered by the flange of said section, said inwardly extending flange having an oblique bearing for fitting against the dished portion of the disk, an outwardly extending portion on the opposite hub section lying adjacent to the dished portion of the disk and terminating in a chamfered portion lying in a plane parallel to the plane of the wheel, and securing bolts passing through the inwardly extending flange of the drum, the disk and the chamfered portion of the flange on the outer hub section, the latter forming a bearing perpendicular to the axes of said bolts.

5. In a vehicle wheel, the combination with a centrally apertured disk secured to and extending inward from said rim, a hub section having a flange secured to the inner portion of said disk, an axial outwardly extending portion, a radial inwardly extending portion, and an axial outwardly extending portion of small diameter, securing means between said hub sections and disk.

6. In a vehicle wheel, the combination with a rim, of a disk extending inwardly therefrom, centrally apertured and provided with a turned flange adjacent to said aperture, a hub section secured to one side of said disk having a portion bearing externally upon said turned flange, and a journal bearing member within said hub section abutting against said flange.

In testimony whereof I affix my signature.

ALDEN L. PUTNAM.